Patented Nov. 26, 1940

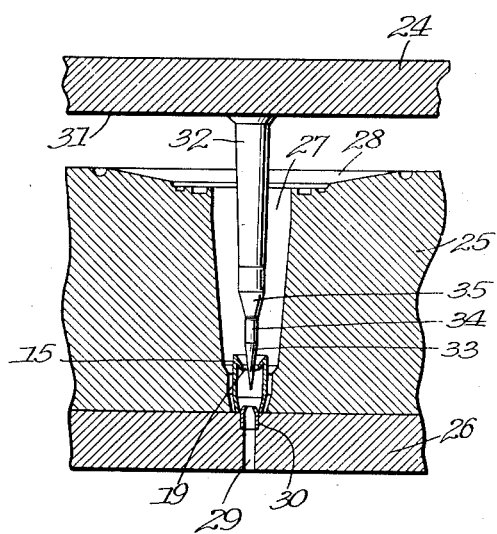
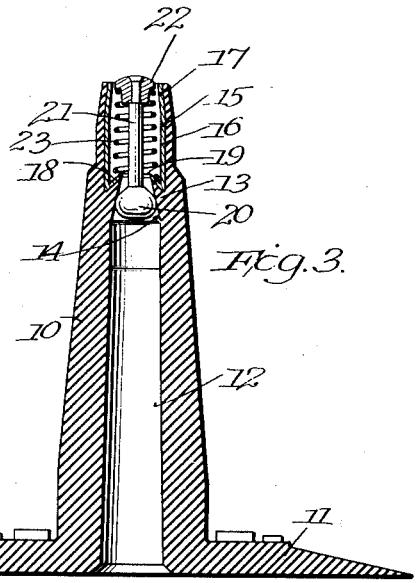
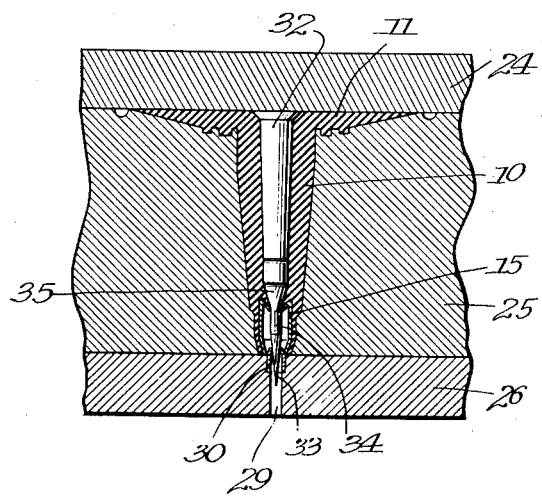
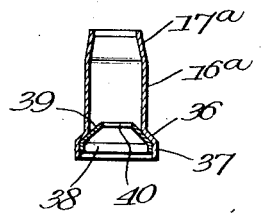

2,222,755

UNITED STATES PATENT OFFICE 2,222,755

VALVE STEM MOLDING MEANS

Frank H. Watson, Jonesboro, Ark., assignor to Jenkins Bros., Bridgeport, Conn., a corporation of New Jersey Original application September 30, 1936, Serial No. 103,436. Divided and this application May 12, 1937, Serial No. 142,257

3 Claims. (Cl. 18—42)

This application is a division of my application Serial No. 103,436, filed September 30, 1936. The latter application is particularly directed to a molded rubber valve stem which in its preferred form embodies a tubular metal insert. The present application is directed to a mold whereby such inserts may be efficiently incorporated in the rubber valve stem body.

The invention will be described with reference to the accompanying drawing in which:

Figure 1 is a partial sectional view of a mold suitable for making rubber valve stems with the insert of the invention incorporated therein.

Figure 2 is a view similar to that of Figure 1 but showing the parts in a final relation.

Figure 3 is an axial section of a rubber valve stem as produced by the mold of Figures 1 and 2, and Figure 4 is an axial section of a modified form of insert.

In its broader aspects the invention is not limited as regards the type of insert except that it shall have the features essential to enable it to cooperate with mold parts as herein contemplated, nor to the specific form of the body to be molded. The stem shown in Figure 3 and the inserts shown in that figure and in Figure 4 are to be taken as typical articles with the production of which the invention is concerned.

Referring first to Figure 3, the rubber valve stem therein shown comprises an elongated body portion 10 which rises from a base flap 11. The stem has a through longitudinal passage 12 which at its upper portion is constricted at 13 to provide a conical downwardly faced shoulder 14 adapted to serve as a valve seat. A tubular insert 15 here shown as made of light metal, such as brass, is molded in the tip end of the body 10. This particular insert comprises a lower substantially cylindrical portion 16 which is surmounted by an upwardly tapered portion 17 so that the end opening of the insert is of reduced diameter as compared to the lower portion of the insert. The lower edge of the insert 15 is inturned to provide a conical annular flange 18 defining an opening 19 which is coaxial with the insert and is of the same diameter as the upper diameter of the constricted portion 13. The flange 18 overlies the shoulder and surrounds at least the upper portion thereof in a manner to resist unusual upward and radial distention thereof by the movable valve body 20.

The valve body 20 is of circular cross section and is carried on the lower end of a pin 21 to whose upper end is fixed a head 22 of circular cross section and of such diameter as to substantially fill the upper end opening of the insert. A compression spring 23 bears at its upper end against the lower part of the head 22 and at its lower end against the upper face of flange 18 so that in the normal position of parts shown in Figure 3 the valve body 20 is seated against the surface 14 to seal the passage 12 and the head 22 lies in the upper extremity of the insert so as to prevent ingress of foreign matter such as dust particles and water.

The insert is vulcanized in the upper end of the stem body during the molding operation and as here shown is entirely rubber covered circumferentially.

For efficient manufacture, it is essential that in the molding operation the plastic material be prevented access to the interior of the insert and this is so whether or not the insert is of the form shown in Figure 3 or whether it is intended to take a standard valve core as shown in my Patent No. 2,018,584, issued October 22, 1935. The problem is efficiently taken care of in accordance with the present invention.

Referring to Figure 1, reference numerals 24, 25 and 26 indicate the parts of a three part mold. The central part 25 of the mold is provided with a cavity 27 which extends completely therethrough and is shaped as the external shape of the body which it is desired to produce, here a rubber valve stem including an integral attachment flap. At its upper end the cavity is flared outwardly at 28 in order that the flap 11, integral with the body portion 10, may be produced. It will be seen that in the present instance, the lower part of the cavity 27 conforms generally in shape to the shape of the insert 15 but is of larger diameter so that when the insert is centered as in Figure 1 an annular space exists between the insert and the cavity walls.

The bottom mold member 26 has an opening 29 axially aligned with the cavity 27. A tubular fitting 30 is positioned in a counter-bore at the upper end of opening 29 and projects into the lower portion of the cavity. The portion of the fitting 30 adjacent the top surface of the mold member 26 has an external diameter which is substantially equal to the internal diameter of the tip end of the tubular insert and snugly fits within the latter. The portion of the tubular fitting 30 which projects above the lower mold member 26 is externally tapered to facilitate the placing of an insert thereon prior to the molding operation which will be later described.

The upper mold member 24 has a substantially flat surface 31 to cover the portion 28 of the cavity. A mold pin 32 is carried by the upper mold member in axial alignment with the opening 29 in the bottom mold member and consequently also with the mold cavity. The mold pin is of proper shape to form that portion of the passage 12 below the flange 18, Figure 3. The pin 32 has a point 33 surmounted by a substantially cylindrical portion 34 which in turn is surmounted by a relatively abrupt conical shoulder 35 which serves to form the conical seating surface 14.

In the use of the apparatus, an insert 15 is placed in the bottom of the mold cavity to be centered therein by the fitting 30 as clearly shown in Figure 1. Customarily, the mass of rubber to be molded is formed with a hole therethrough and impaled on the mold pin. As the mold portion 24 is moved toward the other portions the plastic rubber is carried into the cavity, but it does not reach the bottom of the cavity before the opening 19 of the insert has been entered and closed by the point 33 of the pin. The maximum diameter of the point is somewhat greater than the diameter of opening 19 so that as the point enters the opening sufficiently it exerts a reaming or swaging action in the opening so as to fill the latter completely, the flange 18 being ordinarily somewhat deformed. As the molding proceeds, the portion 34 of the pin enters the opening 19 and maintains the same closed.

At the end of the operation as shown in Figure 2 the conical portion 35 of the pin has slightly entered the opening 19 and due to its abrupt taper it follows that the pin may be readily removed from the insert. In Figure 2 the rubber has completely filled the mold cavity with the exception of that portion occupied by the insert and mold pin. The tip of the insert has been pressed squarely, with sealing contact, against the mold member 26 during the molding operation, and since the other end of the insert is closed by the mold pin, it is impossible for the plastic substance to reach the interior of the insert. The opening 29 and fitting 30 provide clearance for the point of the mold pin and keep the pin in perfect alignment.

From the above, it will be evident that in the practice of the invention it is only essential for the insert to be provided with deformable means such as a fin or the flange shown for cooperation with the mold pin and in other details the inserts may be considerably varied. By way of example, another form of insert which, from a manufacturing standpoint is preferable, is shown in Figure 4.

The insert of Figure 4 has the cylindrical and tapered portions 16a and 17a corresponding with the similar portions of the insert in Figure 3. At its lower end, the portion 16a is outwardly flared at 36 and continued slightly further as a cylindrical skirt 37. A fitting comprising a cylindrical skirt portion 38 and an upwardly tapered flange 39 is pressed within the lower end of the fitting and frictionally retained. The flange 39 defines a circular opening 40 which may be entered by a mold pin in exactly the same manner as heretofore described for the purpose of incorporating the insert in the rubber body. Depending upon the shape of the insert, it may, of course, be necessary to vary the shape of the lower portion of the mold cavity in order to provide proper clearances.

It will be understood then that the insert may be of desired conformation and length and further that the rubber body itself may be varied as to design and that the entire length of the insert need not necessarily be embedded in the rubber body. For example, by proportioning the lower end of the mold cavity so that it will tightly embrace the conical tip portion of the insert, the said tip portion would project uncovered from the resulting molded body and furthermore the centering fitting 30 could be dispensed with.

I do not limit myself to details of form and arrangement except as in the following claims.

I claim:

1. A mold for rubber valve stems, said mold having a tapered cavity, a tubular fitting at the small end of said cavity for internally engaging a tubular insert and centering it with its exterior in spaced relation to the cavity walls, the fitting having a snug peripheral fit in the insert so as to prevent the passage of rubber between the two during the molding operation, and a mold pin whose tip is receivable in said fitting during the molding operation.

2. Apparatus for molding a rubber valve stem and incorporating a metal insert therein, said apparatus including a mold having a base portion and a movable cap portion, said base portion having a cavity therein open toward the cap portion and the latter carrying a pin positioned to enter the cavity when the cap portion is moved toward the base portion during the molding operation to compress moldable substance in the cavity, said insert having a passage therethrough and having an internal annular flange defining a reduced opening in said passage, said insert being positionable in said cavity in spaced relation to the side walls of the latter and with one end against an inner end surface of the cavity, and said mold pin being of such size and form that during the molding operation it engages in said opening with a reaming action whereby to prevent the moldable rubber from passing said flange and whereby to maintain said insert centered and firmly against said surface so that ingress of the moldable rubber to said passage between said surface and the abutting end of said insert is prevented.

3. Apparatus for molding a rubber valve stem and incorporating a metal insert therein, said apparatus including a mold having a base portion and a movable cap portion, said base portion having a cavity therein open toward the cap portion and the latter carrying a pin positioned to enter the cavity when the cap portion is moved toward the base portion during the molding operation to compress moldable substance in the cavity, said insert having a passage therethrough and having an internal annular flange defining a reduced opening in said passage, said insert being positionable in said cavity in spaced relation to the side walls of the latter and with one end against an inner end surface of the cavity, and said mold pin being of such size and form that during the molding operation it engages in said opening with a reaming action whereby to prevent the moldable rubber from passing said flange and whereby to maintain said insert centered and firmly against said surface so that ingress of the moldable rubber to said passage between said surface and the abutting end of said insert is prevented, said pin having an abruptly tapered portion which engages in said opening at the completion of the molding operation so that the pin is readily disengageable from said opening.

FRANK H. WATSON.